United States Patent
Guinan et al.

(10) Patent No.: US 9,108,282 B2
(45) Date of Patent: Aug. 18, 2015

(54) METHOD OF MANUFACTURING HEAT EXCHANGER COOLING PASSAGES IN AERO PROPULSION STRUCTURE

(71) Applicant: Orbital ATK, Inc., Dulles, VA (US)

(72) Inventors: Daniel P. Guinan, Hobe Sound, FL (US); James B. Philpott, Lake Worth, FL (US); Henry K. Webster, Jupiter, FL (US); Christopher Gettinger, Palm Beach Gardens, FL (US)

(73) Assignee: Orbital ATK, Inc., Dulles, VA (US)

( * ) Notice: Subject to any disclaimer, the term of this patent is extended or adjusted under 35 U.S.C. 154(b) by 0 days.

(21) Appl. No.: 14/225,926

(22) Filed: Mar. 26, 2014

(65) Prior Publication Data

US 2015/0174710 A1    Jun. 25, 2015

Related U.S. Application Data

(62) Division of application No. 12/512,515, filed on Jul. 30, 2009, now Pat. No. 8,806,747.

(60) Provisional application No. 61/188,367, filed on Aug. 8, 2008.

(51) Int. Cl.

| | |
|---|---|
| B23P 15/26 | (2006.01) |
| B21D 53/02 | (2006.01) |
| B23H 7/02 | (2006.01) |
| B23H 7/26 | (2006.01) |
| B23H 9/10 | (2006.01) |
| B23H 9/14 | (2006.01) |
| F24H 9/02 | (2006.01) |

(52) U.S. Cl.
CPC ............... *B23P 15/26* (2013.01); *B21D 53/02* (2013.01); *B23H 7/02* (2013.01); *B23H 7/265* (2013.01); *B23H 9/10* (2013.01); *B23H 9/14* (2013.01); *F24H 9/02* (2013.01); *Y10T 29/4935* (2015.01); *Y10T 29/49346* (2015.01); *Y10T 29/49401* (2015.01); *Y10T 29/49996* (2015.01)

(58) Field of Classification Search
USPC .............. 29/890.01, 558, 890.1; 60/752, 756, 60/757, 742, 267; 219/69.12, 121.72
See application file for complete search history.

(56) References Cited

U.S. PATENT DOCUMENTS

| | | | |
|---|---|---|---|
| 5,051,559 A | 9/1991 | Wells | |
| 5,371,945 A * | 12/1994 | Schnoor | ....................... 29/890.1 |
| 6,368,060 B1 | 4/2002 | Fehrenbach et al. | |
| 6,715,293 B2 | 4/2004 | Sillence et al. | |
| 6,829,884 B2 * | 12/2004 | Fint et al. | ......................... 60/267 |
| 7,395,669 B2 | 7/2008 | Sherwood | |

\* cited by examiner

*Primary Examiner* — Richard Chang
(74) *Attorney, Agent, or Firm* — TraskBritt

(57) ABSTRACT

Methods and apparatus of an improved cooling structure having cooling passages are provided. A method includes forming pilot holes with an electrical discharge machine (EDM) drill near a heated flow surface. The pilot holes are then shaped with a wire EDM into cooling passages having a desired shape.

20 Claims, 7 Drawing Sheets

METHOD OF MANUFACTURING HEAT EXCHANGER COOLING PASSAGES IN AERO PROPULSION STRUCTURE

CROSS-REFERENCE TO RELATED APPLICATIONS

This application claims priority to U.S. Provisional Patent Application Ser. No. 61/188,367, filed Aug. 8, 2008, and U.S. patent application Ser. No. 12/512,515 filed Jul. 30, 2009, now U.S. Pat. No. 8,806,747, issued Aug. 19, 2014, both of which have the same title herewith and which are incorporated in their entirety herein.

BACKGROUND

Heat exchange passages (or cooling passages) are commonly used to transfer heat away from heat generating areas of a device to prevent the generation of heat from affecting the performance of the device. The passages are typically filled with a gas or liquid that flows through the passages providing a conduit for the heat. Some devices require close tolerance cooling passages that are a challenge to manufacture. Such devices include metallic structures exposed to high heat flux such as ramjet/scramjet combustors. In these types of combustors, the passages need to be small and close together. An example of a passage diameter is 0.090 inch with a distance between the passages of 0.060 inch to 0.120 inch.

One method of providing passages with such small diameters in close proximity is by machining grooves into one part and then attaching a face sheet to the part covering the grooves. Another method of machining grooves is with the use of water jets. A typical method of attachment of the face sheet is by welding or brazing the face sheet to the part with the machined grooves. However, this technique has its limitations. For example, when the combustor is cylindrical in shape, having a relatively small diameter, it can be difficult to form the grooves in the part as well as attach the face sheet to the part. Moreover, it is difficult to make select shapes of passages such as circular passages with a face sheet. Another method used to achieve circular passages is by machining semi-circular grooves in two parts and then mating the parts together. However, this technique requires twice the machining since the semi-circular grooves have to be formed in both parts. In addition, the length of passages and the proximity of the passages may make conventional drilling with a bit difficult, if not impossible. For example, the passages in ramjet/scramjet combustors can be 16 inches or longer. This length makes use of a conventional drill bit difficult because it is hard to keep the drill bit from penetrating a surface of an interior chamber or from drifting into another cooling passage.

For the reasons stated above and for other reasons stated below, which will become apparent to those skilled in the art upon reading and understanding the present specification, there is a need in the art for a technique to make cooling passages of small diameters and long in depth in an effective and efficient manner and for an improved cooling structure.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of forming cooling passages in a heat exchanger is provided. The method includes forming pilot holes with an electrical discharge machine (EDM) drill near a heated flow surface. The pilot holes are then shaped with a wire EDM into cooling passages having a desired shape.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout the figures and the text.

DETAILED DESCRIPTION

In the following detailed description, reference is made to the accompanying drawings, which form a part hereof and in which is shown by way of illustration, specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of creating cooling passages in a heat exchange system. In one embodiment, a method of creating cooling passages within the flow path walls (or combustor walls) of a ramjet/scramjet engine is provided. However, the creation of the cooling passages can apply to any heat exchange system using cooling passages or any device requiring closely located passages. In particular, embodiments allow cooling passages to be placed in close proximity to a heated flow path surface. This is important in reducing potentially damaging thermal gradients, while avoiding the cost, complexity, and limited cycle life typically associated with multiple piece exchangers. Embodiments are readily adaptable to both round and non-round flow path cross-sections in similar combustor applications. Moreover, embodiments allow for the manufacture of cooling passages with a variety of cross-sectional shapes including passages with internal fin features to provide enhanced cooling effectiveness in higher heat load areas. Some embodiments can be incorporated in any heat exchanger wall whose inner flow path contour can be described as a ruled surface (i.e., a straight line interpolation from one section of the flow path to the next). A complete engine or heat exchanger structure is constructed by stacking and joining individual sections as described in embodiments set out below.

Figure 1:
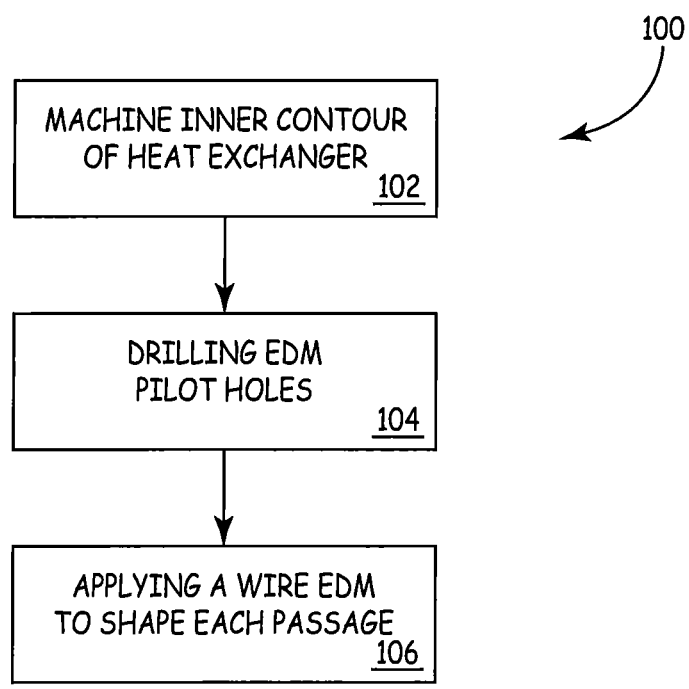
FIG. 1 is a passage forming flow diagram of one embodiment of the present invention.

In regard to the ramjet/scramjet example, reference is made to FIG. 1. FIG. 1 provides a passage forming flow diagram 100 of one embodiment. As illustrated, the process starts by forming an inner contour of an engine section or heat exchanger (102). In one embodiment, this is done with a wire electrical discharge machine (EDM) process. A wire EDM uses a wire as an electrode. Sparks discharging from the continuously conductive wire melt and vaporize material that conducts electricity. Typically, a computer numerical control (CNC) is used to control the wire EDM to form select patterns in the electrically conductive material. In other embodiments, the inner contour of the heat exchange is formed with conventional means to a close tolerance. One such conventional means is with the use of a CNC lath machine. After the inner contour is formed, pilot holes are drilled parallel to a flow path surface through combustor walls of the heat exchanger (104). The pilot holes are drilled with an EDM drill. An EDM drill uses a long thin hollow electrode. In one embodiment, the electrode is rotated to achieve a uniformly controlled electrical spark that melts away material that can conduct electricity. A fluid passes through the hollow electrode to flush out the melted material. An example of diameters of the pilot holes that can be made with this process is 0.030 inch to 0.040 inch. In embodiments, the pilot holes may be up to 16 inches in length or longer. In a ramjet/scramjet engine example, the pilot holes are spaced around the perimeter at clocking angles, predetermined to produce the desired cooling effects based on the local heat flux cooling properties and final passage geometry. In other embodiments, the passages are of different lengths. Once the pilot holes are drilled (104), a wire EDM is used to open the pilot holes to their final size, shape and distance from the flow path surface of the engine surface 106. Any shape is contemplated that is within the capabilities of the EDM system used.

Figure 2:
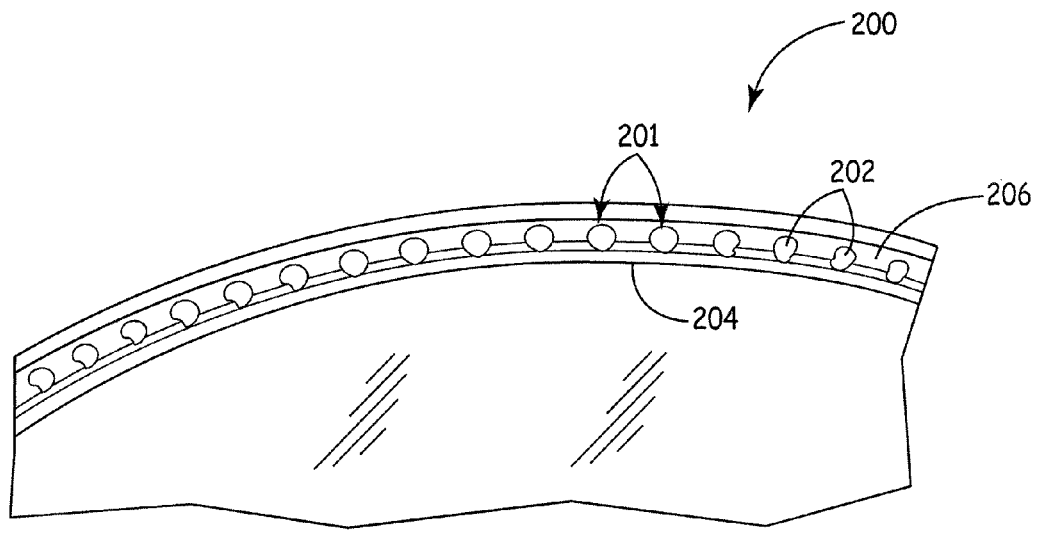
FIG. 2 is an end perspective view of a portion of a combustor wall of one embodiment of the present invention.
Figure 3:
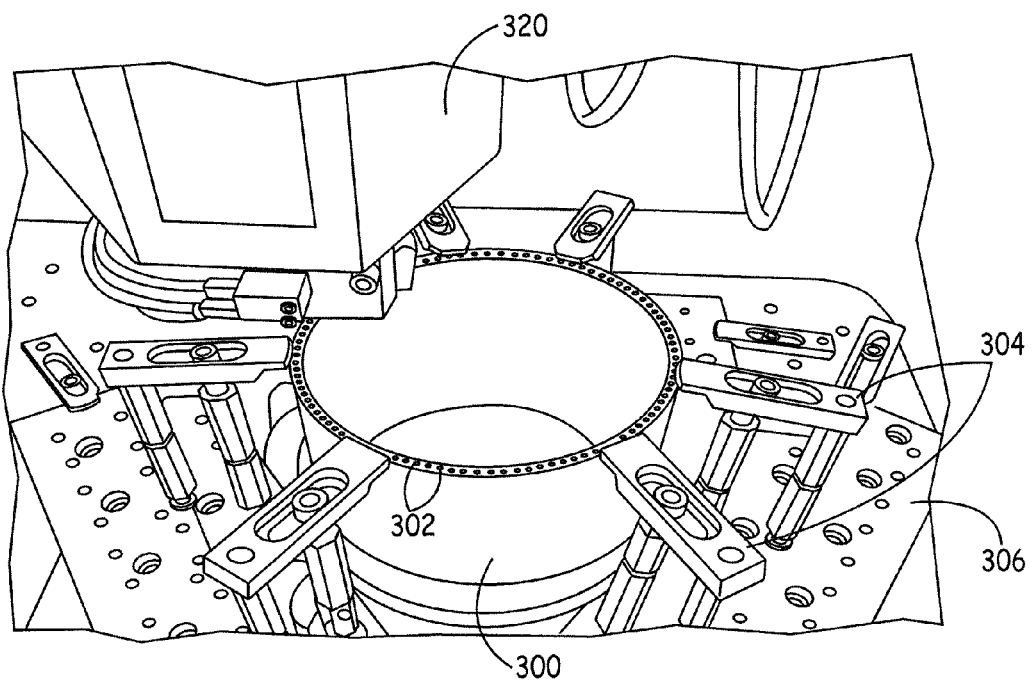
FIG. 3 is a side perspective view of a combustor wall illustrating openings of pilot holes of one embodiment of the present invention.
Figure 4:
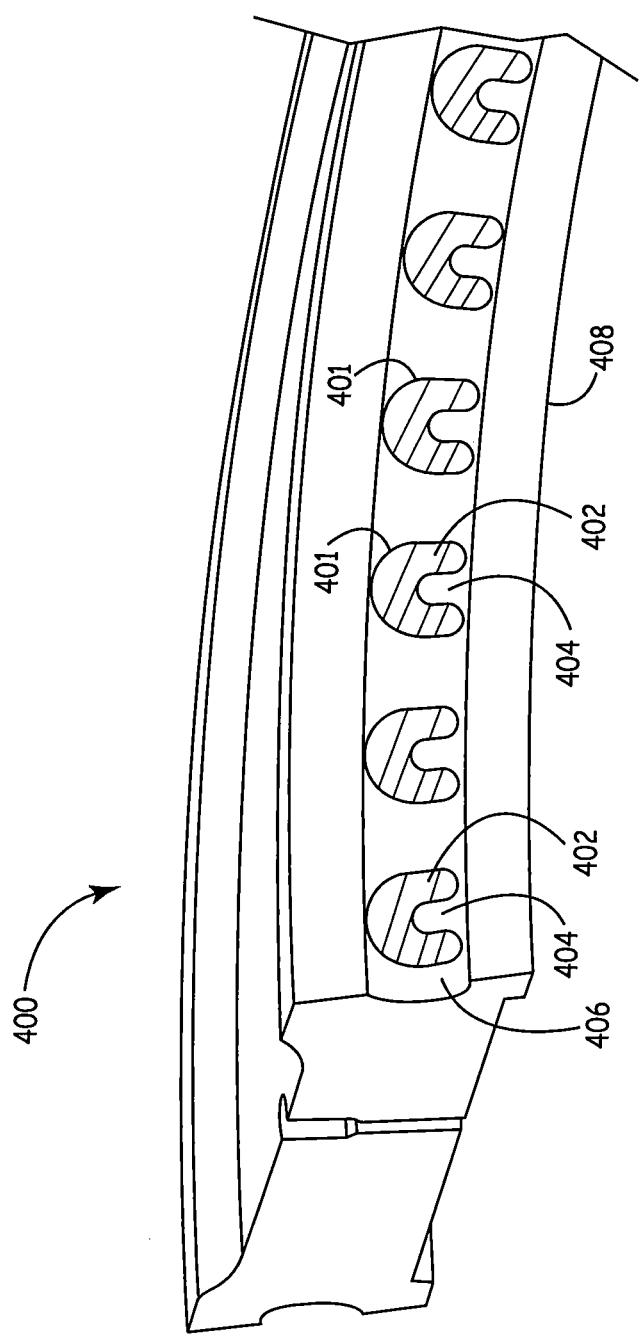
FIG. 4 is an end perspective view of another portion of a combustor wall of a heat exchanger of one embodiment of the present invention.

FIG. 2 illustrates a portion of a combustor wall 200 of a ramjet/scramjet engine having cooling passages 202 of one embodiment. As illustrated, the cooling passages 202 are spaced around a perimeter of the combustor wall 200. FIG. 2 also illustrates an inner contour 204 of the combustor wall 200 and an annular groove 206 that is framed in an end of the combustor wall 200 and around a perimeter of the inner contour 204. Openings 201 of each cooling passage 202 are contained in the groove 206. The function of the groove 206 is discussed below. Referring to FIG. 3, an illustration of the opening of pilot holes in a combustor wall 300 of a heat exchanger into cooling passages 302 with a wire EDM 320 is illustrated. As illustrated, the combustor wall 300 is retained in a holding device 306 with retaining arms 304, while the wire EDM 320 shapes each pilot hole to a cooling passage 302. As discussed above, with this process the cooling passages 302 can be opened to a desired shaped. An example cooling passage shape includes a circle, as illustrated in FIG. 2. Another example shape is illustrated in FIG. 4. FIG. 4 illustrates another portion of a combustor wall 400 of a heat exchanger having a plurality of cooling passages 402 along a perimeter of an inner contour 408. In this example, of an embodiment, each cooling passage 402 includes an interior extending portion 404 (or fin 404) that provides further surface area, than the circular passage 202 of FIG. 2, for added heat transfer. Hence, in the embodiment of FIG. 4, the cooling passages 402 are U-shaped. The cooling passages 402 can be shaped in any form that is within the capabilities of the wire EDM system as discussed above. Also illustrated in FIG. 4, is an annular groove 406 that contains and connects openings 401 to each of the cooling passages 402.

Figure 5:
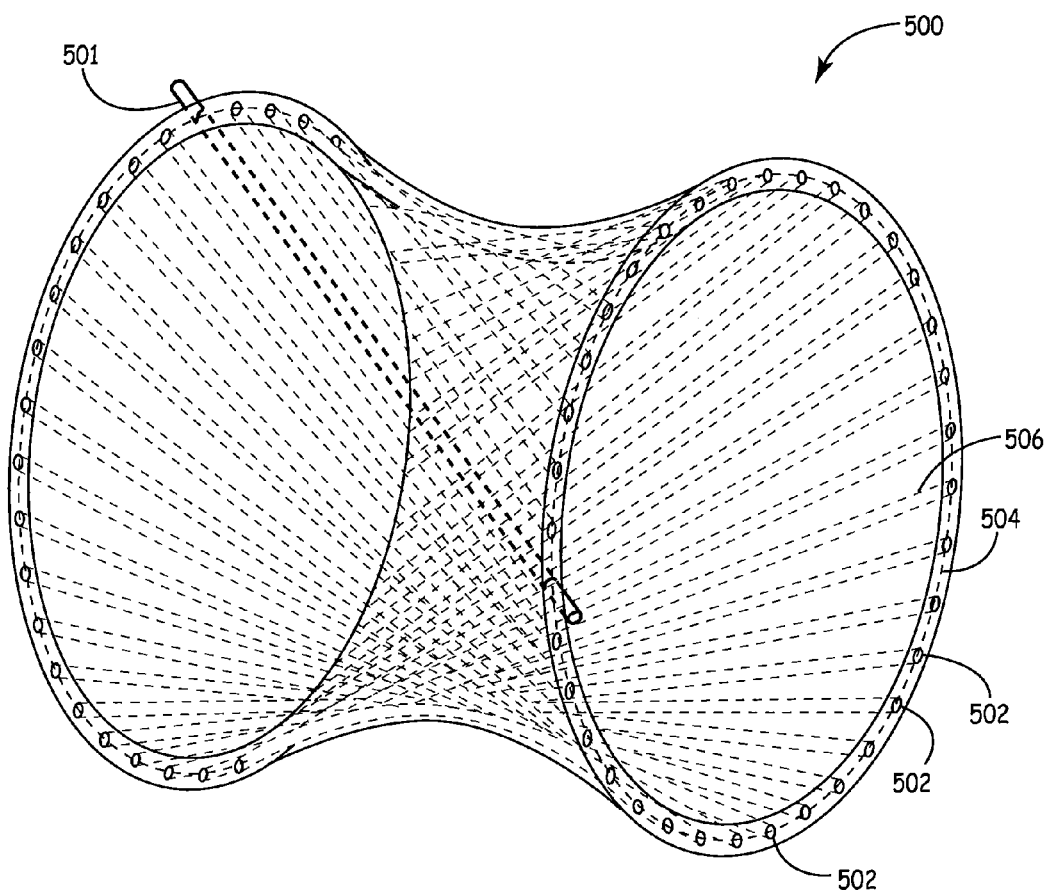
FIG. 5 is a side perspective view of a combustor wall of a heat exchange chamber of another embodiment of the present invention.

Methods used in embodiments not only allow for cooling passages to be shaped as desired, but they also allow for cooling passages to be formed at an angle in relation to a surface opening end. For example, FIG. 5 illustrates a combustor wall 500 of a heat exchange chamber of another embodiment. In this embodiment, cooling passages 502 are formed at an angle in relation to annular surface 504 (end) that contains openings to the cooling passages 502. Referring to 501, an illustration of a cooling passage through the combustor wall 500 of the heat exchanger is shown. As illustrated, the angling of the cooling passages 502 allows for the shape of combustor wall 500 to be altered, which in this case is the shape of an hour glass. Also illustrated in FIG. 5, is the inner contour (or flow path) 506 of the combustor wall 500 of the heat exchanger. Any shape combustor wall can be used in the embodiments, provided the combustor wall has a ruled surface. As discussed above, a ruled surface is present when a straight line interpolation from one point on a cross-section of the flow path to a point on another cross-section of the flow path is achieved.

Figure 6:
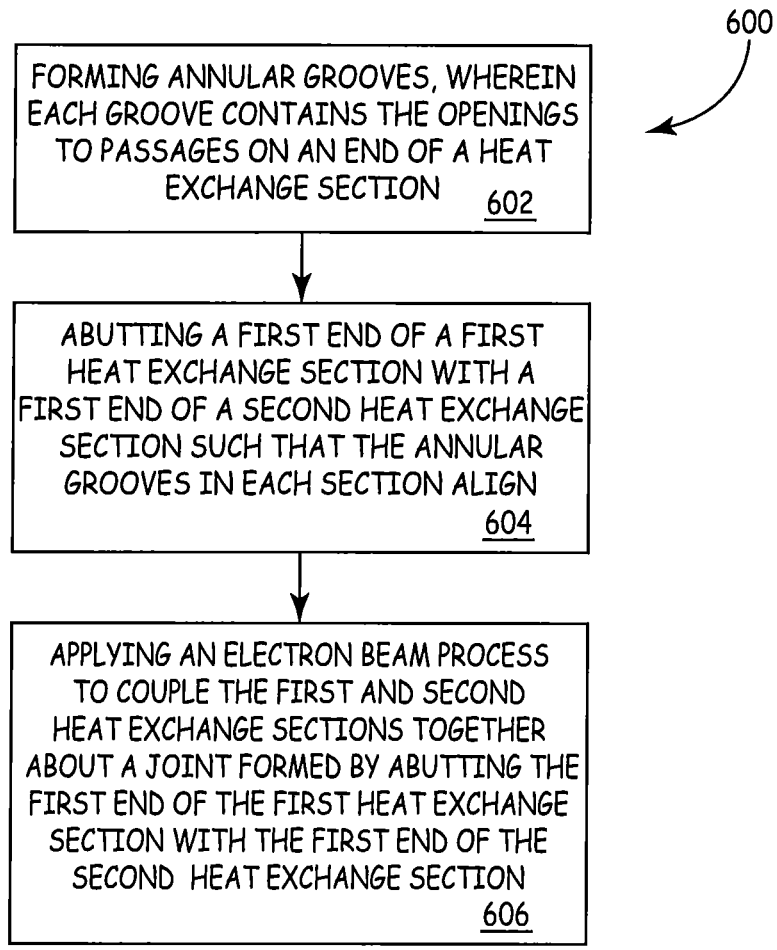
FIG. 6 is an illustration of a section connecting flow diagram of one embodiment of the present invention.

The annular grooves 206 and 406 as briefly discussed in regard to FIGS. 2 and 4 allow for heat exchangers with multiple sections. In particular, the annular grooves 206 and 406 are used to provide a coupling cooling passage that provides an interface channel between cooling passages in two attached combustor wall sections. Further details regarding annular grooves are provided in FIG. 6, which provides a section connecting flow diagram 600 of one embodiment, and FIG. 7, which illustrates a heat exchanger 700 with two combustor wall sections 702 and 704 coupled together. The process begins in FIG. 6 by forming annular grooves 706 and 710 in each end of the heat exchange sections (or combustor walls 702 and 704) (602). In this example, the combustor walls 702 and 704 are cylindrical in shape. As discussed above, any shape of a combustor wall section having a ruled surface is contemplated as having grooves of an appropriate shape containing associated openings to the cooling channels. Hence, the present invention is not limited to cylindrical-shaped heat exchange sections. Each groove 706 and 710 contains openings 708 to the cooling passages on a particular end of a heat exchange section. In connecting heat exchange sections (or combustor walls 702 and 704) together, a first end 712 of a first heat exchange section 702 is placed to abut a first end 714 of a second heat exchange section 704, such that the respective grooves 706 and 710 align with each other (604). In one embodiment, the abutted first end sections 712 and 714 of the first and second heat exchange sections 702 and 704 create a weld joint geometry commonly referred to as a "tier" weld. In one embodiment, sections 702 and 704 are securely coupled to each other with an electron beam process (606). The electron beam process joins the sections 702 and 704 together in a single pass that goes around the perimeter of a joint formed by the abutting first end 712 of the first heat exchange section 702 and the first end 714 of the second heat exchange section 704.

Figure 7:
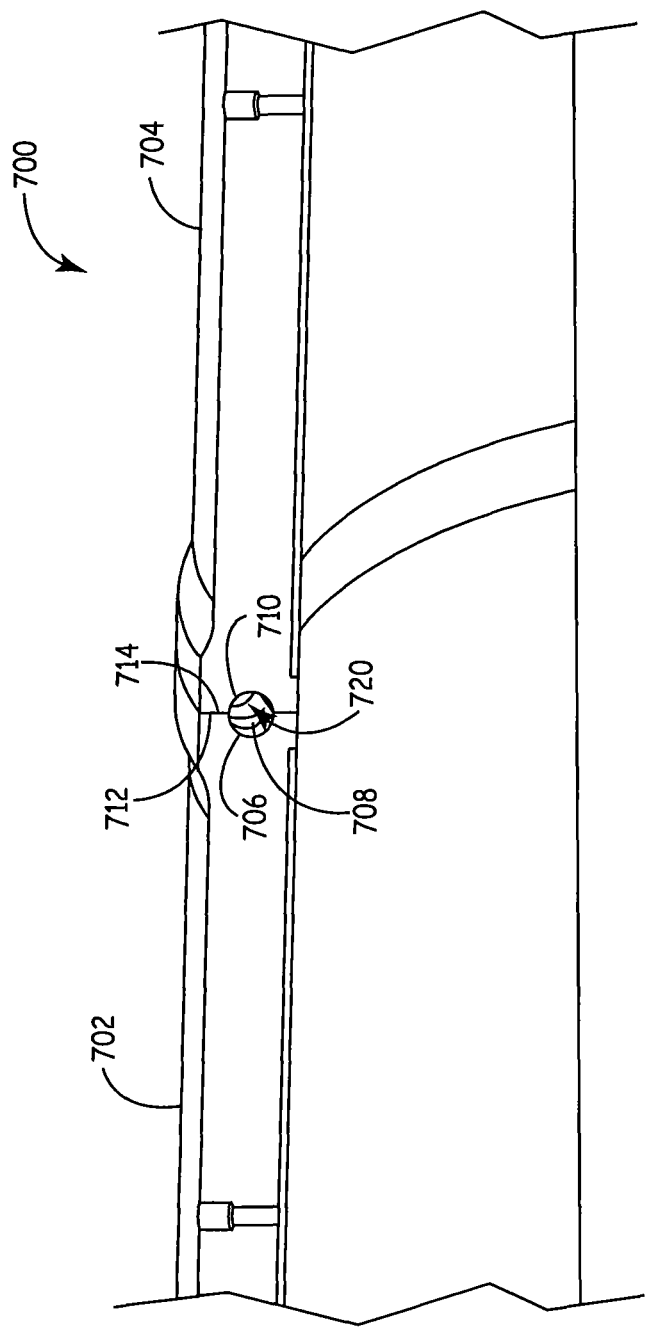
FIG. 7 is a cut-away side view of a heat exchanger with two combustor wall sections of one embodiment of the present invention.

As illustrated in FIG. 7, openings 708 to the cooling passages are located in the annular grooves 706 and 710. Further as illustrated in FIG. 7, the annular grooves 706 and 710 form a coupling cooling passage 720 when the two exchange sections 702 and 704 are coupled together. The coupling cooling passage 720 provides an interface channel between the cooling passages in the two exchange sections 702 and 704. This design allows for a plurality of the heat exchange sections (combustor walls) to be coupled together. It also allows for varying in the number of cooling passages in each heat exchange section 702, 704, since the cooling passages themselves do not have to be aligned because they open into the coupling cooling passage 720 formed by the annular grooves that provide the channel interface. Hence, one section of heat exchanger may have more cooling passages, as may be required for the application, than another section.

Figure 8:
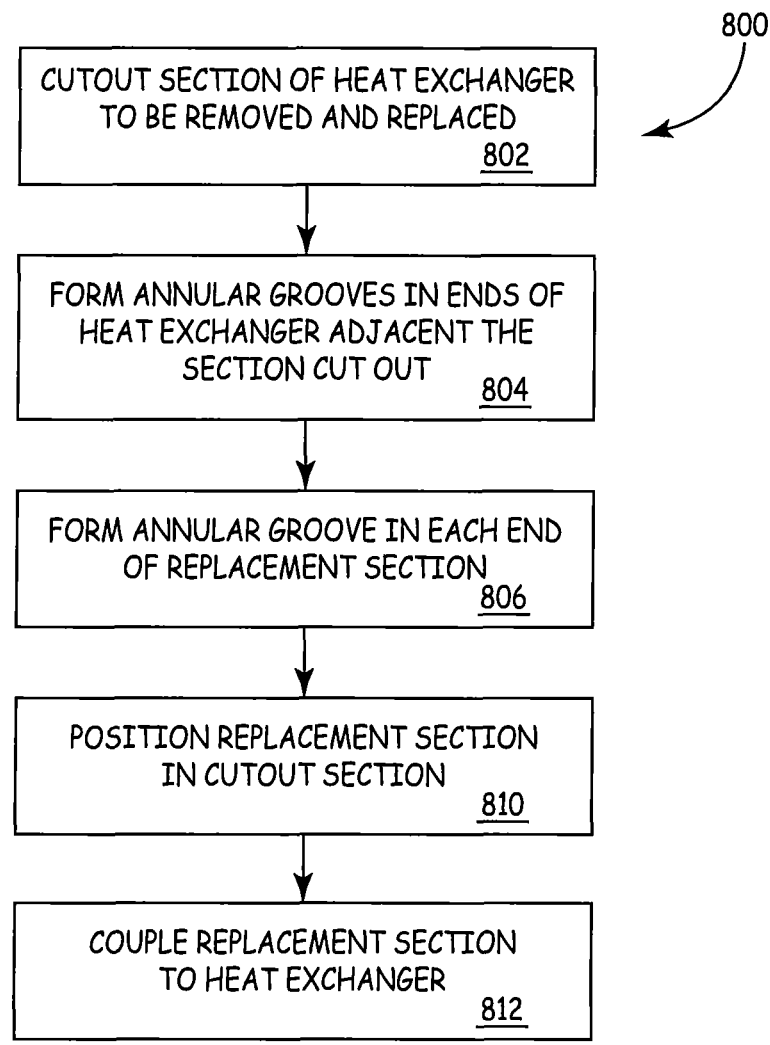
FIG. 8 is a repair/replacement flow diagram of one embodiment of the present invention.

The design also allows for easy repair of heat exchange systems or replacement of heat exchange sections. In particular, the unique joint geometry and welding techniques as set out above allows for easily reparable heat exchange systems. With embodiments, a damaged heat exchange section may be removed and replaced, if desired. Moreover, in embodiments the exchanger may be split and rejoined if access to internal components in the flow path is required. Referring to FIG. 8, a repair/replacement flow diagram 800 of one embodiment is provided. In this example method, a section to be replaced is cut out of the heat exchanger (802). Grooves, which may be annular grooves in the cylindrical combustor wall example, as shown in FIG. 7, are then formed in ends of the heat exchanger that are adjacent to the section that was cut out (804). Likewise, grooves are formed in each end of a replacement section (806). The grooves are formed to contain respective openings to cooling passages. The replacement section is then positioned in the section that was cut out with the grooves being aligned as illustrated in FIG. 7 (810). The replacement section is then attached to the heat exchanger (812). In one embodiment, this is done with an electron beam process as described above.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

The invention claimed is:

1. A method of forming a heat exchange system, the method comprising:
    abutting an end of a first heat exchange section against an end of a second heat exchange section, the first heat exchange section and the second heat exchange section each including therethrough;
    aligning a groove in the end of the first heat exchange section extending in a direction transverse to the cooling passages extending through the first heat exchange section and positioned at an end of each of the cooling passages with a groove in the end of the second heat exchange section extending in a direction transverse to the cooling passages extending through the second heat exchange section and positioned at an end of each of the cooling passages to form a coupling cooling passage providing an interface channel between the cooling passages in the first heat exchange section and the cooling passages in the second heat exchange section; and
    joining the end of the first heat exchange section with the end of the second heat exchange section.

2. The method of claim 1, wherein joining the end of the first heat exchange section with the end of the second heat exchange section further comprises applying an electron beam process to join the first heat exchange section and second heat exchange section.

3. The method of claim 1, further comprising defining the interface channel to be in direct communication with each of the cooling passages of the first heat exchange section and the cooling passages of the second heat exchange section.

4. The method of claim 1, further comprising forming each of the cooling passages of the first heat exchange section and the cooling passages of the second heat exchange section comprising:
    forming a plurality of pilot holes in the first heat exchange section and the second heat exchange section with an electrical discharge machine (EDM) drill; and
    shaping the pilot holes with a wire EDM to form the cooling passages.

5. The method of claim 1, wherein abutting an end of a first heat exchange section against an end of a second heat exchange section comprises contacting an axial end of the first heat exchange section having the groove of the first heat exchange section formed therein with an axial end of the second heat exchange section having the groove of the second heat exchange section formed therein.

6. A heat exchange section comprising:
    a combustor wall comprising:
        a first end having a first groove in the combustor wall extending around the combustor wall;
        a second end, opposing the first end, having a second groove in the combustor wall extending around the combustor wall, wherein the combustor wall defines an inner flow path contour extending between the first end and the second end; and
        a plurality of cooling passages extending in a direction transverse to the first groove and the second groove from the first end to the second end proximate the inner flow path contour, each cooling passage of the plurality of cooling passages extending from the first groove at the first end and the second groove at the second end and having a first opening in the first groove of the first end and a second opening in the second groove of the second end.

7. The heat exchange section of claim 6, wherein the combustor wall is cylindrical in shape and the first groove in the first end and the second groove in the second end exhibit an annular shape extending radially around the cylindrical combustor wall.

8. The heat exchange section of claim 7, wherein the plurality of cooling passages extend along an axial length of the combustor wall from the first end to the second end.

9. The heat exchange section of claim 6, wherein a cross-sectional shape of the plurality of cooling passages exhibits one of a circular shape and a U-shape.

10. The heat exchange section of claim 6, wherein one of the first groove in the first end and the second groove in the second end are configured to form a coupling cooling passage that provides a collective interface channel between each cooling passage of the plurality of cooling passages of the combustor wall and cooling passages in a second, different heat exchange section when the second, different heat exchange section is coupled to the heat exchange section.

11. The heat exchange section of claim 6, wherein the combustor wall comprises a ruled surface.

12. The heat exchange section of claim 6, wherein the cooling passages are formed at an oblique angle in relation to the first end and the second end of the combustor wall.

13. The heat exchange section of claim 12, wherein the combustor wall exhibits an hour glass shape.

14. A heat exchange system, the system comprising:
a plurality of heat exchange sections, each heat exchange section having a first end and a second end, each heat exchange section having a plurality of cooling passages extending through the respective heat exchange section between the first end and the second end proximate an inner contour of the heat exchange section, each heat exchange section further having a groove in each of the first end and the second end, each cooling passage of the plurality of the cooling passages in each heat exchange section having an opening in direct communication with the groove in the first end and another opening in direct communication with the groove in the second end, wherein a coupling cooling passage is defined at an interface between a heat exchange section of the plurality of heat exchange sections and an adjacent heat exchange section of the plurality of heat exchange sections by the groove at the first end of the heat exchange section and the groove at the second end of the adjacent heat section, the coup passage providing an interface channel between the plurality of cooling passages of the heat exchange section and the adjacent heat exchange section.

15. The system of claim 14, wherein the number of cooling as exchange section differs from the number of the adjacent heat exchange section.

16. The system of claim 14, wherein at least one of the plurality of cooling passages in at least one of the plurality of heat exchange sections exhibits a cross-sectional shape of at least one of a circular shape and a U-shape.

17. The system of claim 14, wherein the plurality of cooling passages in at least one of the plurality of heat exchange sections are at an oblique angle in relation to the first end and the second end of the at least one heat exchange section.

18. The system of claim 14, wherein the grooves in the first end and the second end of each of the plurality of heat exchange sections comprise annular grooves extending about each respective heat exchange section.

19. The system of claim 14, wherein each heat exchange section comprises an inner flow path contour having a ruled surface.

20. The system of claim 14, wherein the cooling passages of each of the plurality of heat exchange sections extend radially around each of the plurality of heat exchange sections.

* * * * *